(12) United States Patent
Cartwright

(10) Patent No.: US 7,363,112 B2
(45) Date of Patent: Apr. 22, 2008

(54) DIGITAL MOISTURE MONITOR CONTROLLER WITH WIDE APPLICATIONS SOIL, AND HYDROPONICS MOISTURE SENSORS, AND OPTIONAL X10 MULTI-SENSOR, MULTI-PUMP CONTROLLER

(76) Inventor: Brent Arthur Cartwright, 2547 California St., Eureka, CA (US) 95501

( * ) Notice: Subject to any disclaimer, the term of this patent is extended or adjusted under 35 U.S.C. 154(b) by 616 days.

(21) Appl. No.: 10/843,522

(22) Filed: May 10, 2004

(65) Prior Publication Data

US 2005/0240313 A1  Oct. 27, 2005

(51) Int. Cl.
  *G05D 7/00* (2006.01)
(52) U.S. Cl. .................. 700/284; 702/45; 702/55; 239/1; 137/2
(58) Field of Classification Search ........ 700/282–284; 702/45–49, 55; 239/1; 73/1.16; 137/2
  See application file for complete search history.

(56) References Cited

U.S. PATENT DOCUMENTS 3,892,982 A * 7/1975 Holmes ...................... 307/118
4,321,937 A * 3/1982 Littlehale ................... 137/78.3
6,683,535 B1* 1/2004 Utke ........................... 340/604

* cited by examiner

*Primary Examiner*—Leo Picard
*Assistant Examiner*—Sean Shechtman
(74) *Attorney, Agent, or Firm*—Central Coast Patent Agency, Inc.

(57) ABSTRACT

Utilizing the latest microprocessor technology, the digital moisture monitor controller along with its wide applications alternating current conduction moisture sensors and optional X10 multi sensor multi pump controller, controls moisture levels in all soils and all of today's hydroponics mediums.

6 Claims, 10 Drawing Sheets

DIGITAL MOISTURE MONITOR CONTROLLER WITH WIDE APPLICATIONS SOIL, AND HYDROPONICS MOISTURE SENSORS, AND OPTIONAL X10 MULTI-SENSOR, MULTI-PUMP CONTROLLER

BACKGROUND AND FIELD OF INVENTION

The invention relates to automatic type watering devices. More specifically to automatic control of moisture levels in all soils and all of today's hydroponics type mediums such as rock wool, grow cubes, pumice stone, and the many other types of growing mediums.

Utilizing digital circuitry the device will display current moisture level in percentage, 0% representing absolute 0 moisture and 100% representing complete moisture saturation. If the moisture level drops to below the moisture level preset the device will activate buzzer alarm, LED alarm and pump control output for one minute or until the moisture preset level is reached. In doing so the moisture level is kept constant in the medium or soil, maintaining a moisture zone, which can be adjusted for wetter or dryer levels.

In the wide field of hydroponics applications many problems related to plant health occur due to, too much moisture or, too little moisture at the root zone of the plant. In some types of hydroponics systems the plants root system is completely submersed in water and nutrients, which is fine for low profile non fruiting types of plants. However large fruit bearing plants need aeration and root to plant support, which is provided by a medium. If the optimum moisture level is maintained within the medium, the plants resistant to disease greatly increases, as well as plant yield.

Current monitoring and automatic watering devices are not designed to handle all of the different types of hydroponics mediums. Also they lack or can't perform linear tracking, (actual amount of moisture in medium at any given time versus medium dry weight) and provide optimum moisture levels, based on the plant requirements such as temperature, humidity, PH, PPM, water and nutrient uptake.

Soil moisture sensor-controller devices, control moisture for their particular soil type applications. For example, U.S. Pat. No. 6,401742 to Cramer, U.S. Pat. No. 5,570030 to Wightman, U.S. Pat. No. 4,796654 to Simpson and U.S. Pat. No. 4,197,866 to Neal. However, These devices would not perform to specifications or fail to operate in a hydroponics medium such as pumice stone or clay pellets.

While these devices may be suitable for the particular purpose employed or for general use, they would not be suitable for the purposes of the present invention as disclosed here after.

BRIF SUMMARY OF THE INVENTION

The digital moisture monitor controller with wide applications soil and hydroponics moisture sensors and multi sensor multi pump controller, provide accuracy and operational simplicity for moisture control in all soils and all of today's hydroponics grow mediums.

The heart of the system is comprised of a microprocessor which provides sensing signal, frequency conversion digital integrator, 4½ digit liquid crystal display, minimum preset memory; pump relay control, alarm LED and buzzer control.

Due to a wide and varying PPM (parts per million) or EC (electrical conductivity) in mediums and soils, a unique tare circuit is incorporated which provides the correct offset at the input of the integrator. In doing so large offsets can be tared off much like a digital scale, while maintaining an adjustable moisture range of 0-100%.

Also a flood sensing circuit is employed which is independent of the microprocessor. In the event a flood is detected the flood sensing circuit will activate flood LED, alarm tone and override the pump control output from the microprocessor preventing 120V AC from appearing at the pump control AC outlet.

Three sensors are included, a dual soil/hydroponics moisture sensor, a hydroponics only moisture sensor and a wet dry flood sensor.

An optional X10 digital multi sensor multi pump controller unit provides up to 10 additional moisture sensors and 10 additional pumps.

BRIEF DISCRIPTION OF THE DRAWINGS

In the drawings, like elements are depicted by like reference numerals.

The drawings are briefly described as follows.

DETAILED DESCRIPTION OF THE PREFERRED EMBODIMENTS

Figure 1:
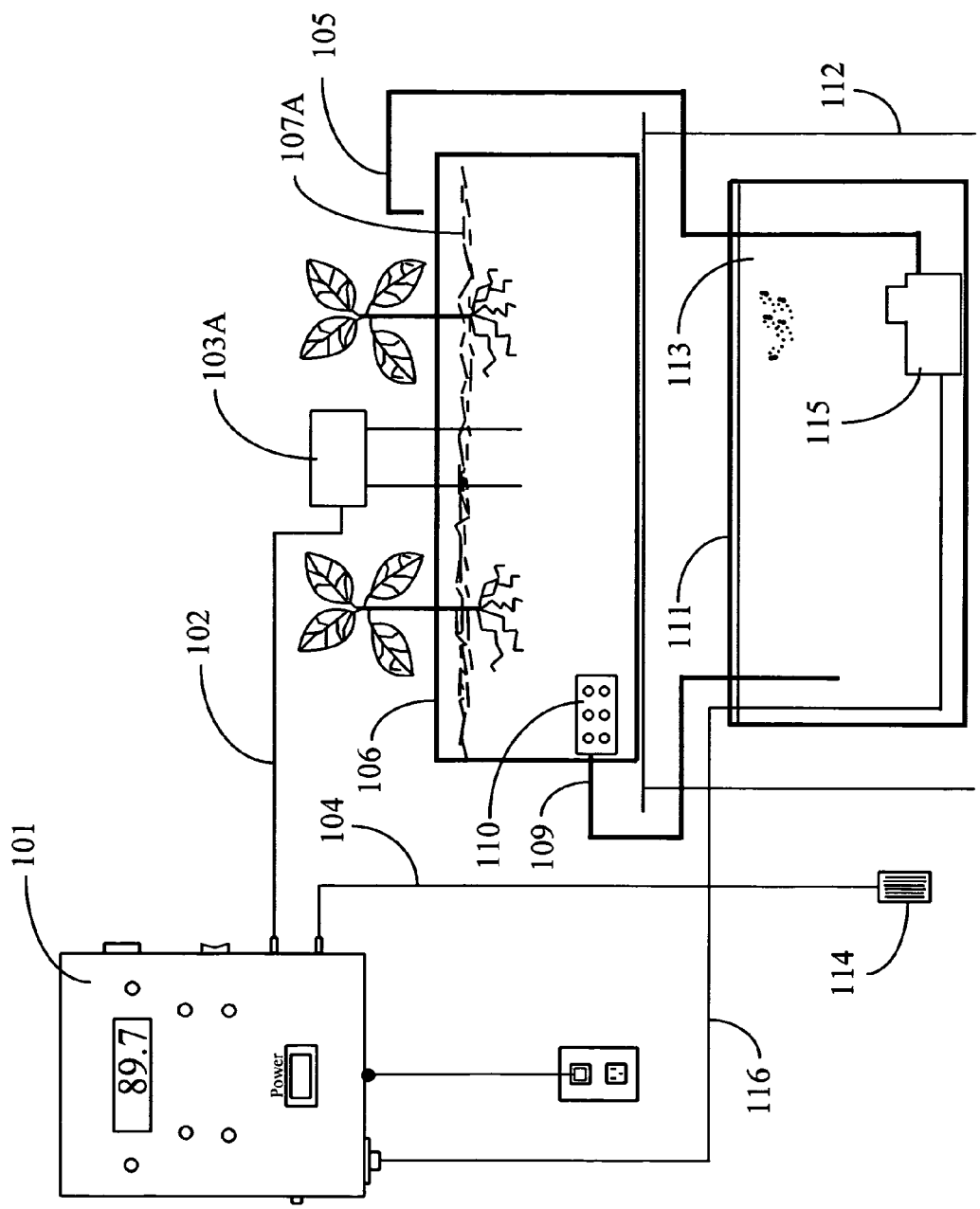
FIG. 1 is a two dimensional partial cutaway drawing, illustrating the digital moisture controller and sensor in soil or soil less medium.

FIG. 1 illustrates a device according to an embodiment of the present invention for monitoring and controlling moisture levels in soil and Soil-less mediums, which is referred to hereinafter, simply as a moisture controller 101. Moisture controller 101 includes two moisture sensors and a flood sensor. Moisture sensor 103A is a dual ftmction AC conduction-type moisture sensor with a plug in cord 102, which is referred to hereinafter as moisture sensor 103A. Flood sensor 114 uses a DC conduction leaf type printed circuit board pattern with a plug in cord 104, which shall be referred hereinafter as flood sensor 114. Any frrther reference to moisture controller lOidrawing hereinafter shall also refer to FIG. 3 for larger scale.

Figure 3:
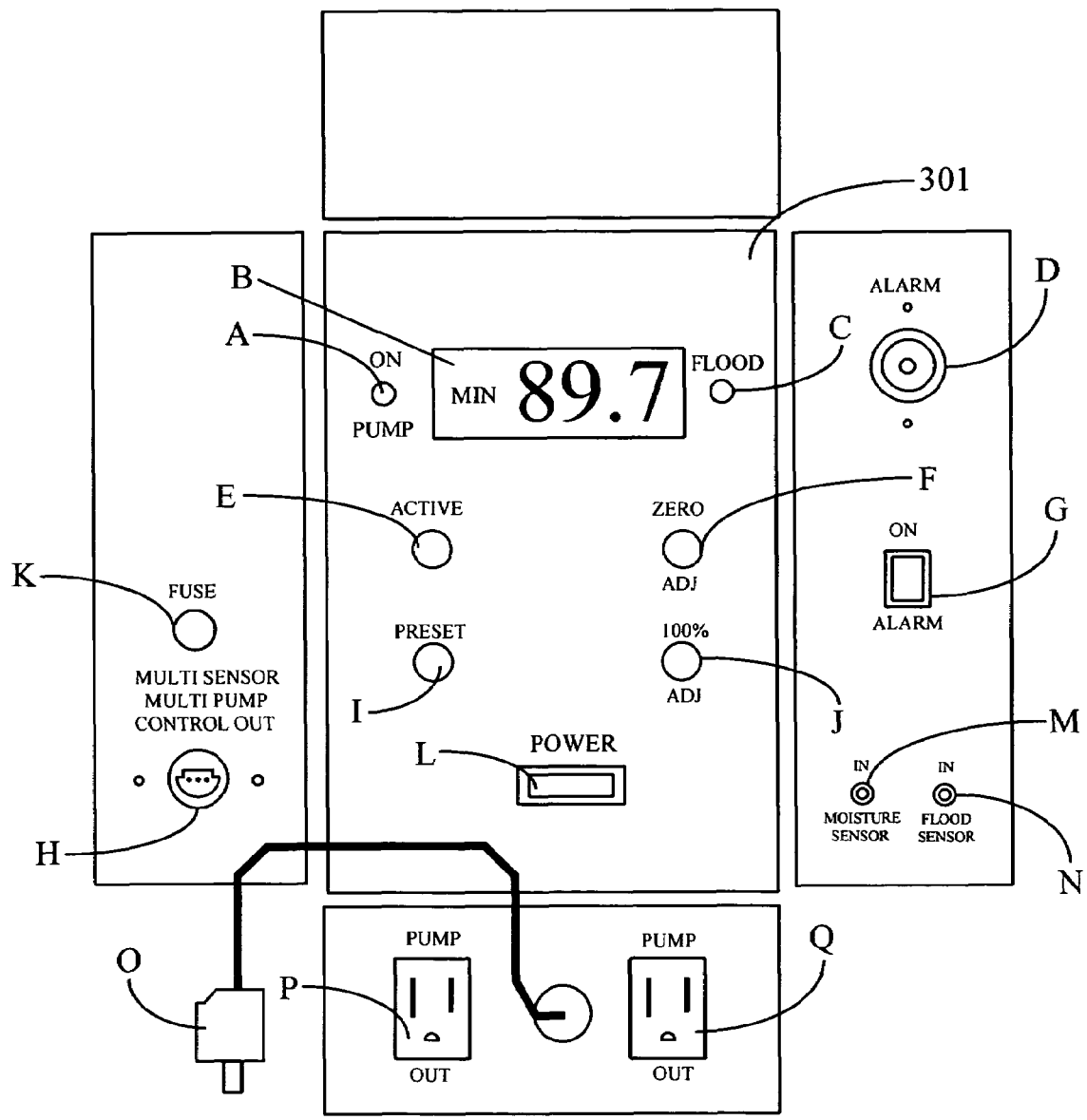
FIG. 3 is a unfolded two-dimensional drawing, illustrating the digital moisture controllers left, right, bottom and top panels laid flat in relation to the front panel.

Moisture controller 101 must be set up for its particular application before use. This is done by plugging the power cord O into a wall outlet, and pushing power switch L to on. Next, select proper moisture sensor 103A for FIG. 1 application, and plug it into MOISTURE SENSOR IN M (FIG. 3). With moisture sensor 103A out of soil or medium, adjust the ZERO ADJ control F (FIG. 3) until the display B reads 0. Next, apply water and nutrient mix 113 until what the user would consider 100% saturation, then place moisture sensor 103A in soil or medium to root zone, and adjust the 100% control J until the display B reads 100%. Next and final step, program the minimum moisture preset level by pushing the preset button I and holding it down until the display B reads what the user would consider an appropriate minimum moisture level or actual amount of moisture remaining in soil or medium, in this case 50% has been selected.

To activate pump and alarm control, push ACTIVE button E, and MIN will appear in the display B. In FIG. 1, the moisture controller device 101 is shown in use. Located within the medium container 106 is soil or soil-less rock-wool type medium 107A and plants. Also included is a water return flow filter 110 and moisture sensor 103A. When the actual amount of moisture in the soil or medium drops below the minimum moisture preset level, the moisture controller 101 initiates a one minute watering cycle by supplying 120v AC to PUMP OUT P, activates PUMP ON LED I, flashes MIN in display B and activates the alarm multi-tone for one minute indicating to user that the watering cycle has been initiated. Power is supplied to the submersible pump 115, via power cord 116. PUMP OUT Q is common to PUMP OUT P and is not used in this application. The alarm switch G switches on and off the watering cycle multi-tone only. If the minimum moisture preset level is not reached within one minute, pump output P, and pump on LED A will remain on. Also MIN will continue to flash in the display until the moisture content m the soil or medium is at or slightly above the minimum moisture pre-set level. Once the minimum preset level is reached the watering cycle is completed, the pump output P and pump on LED A will shut off, MIN will no longer flash in the display B, and the numeral portion of the display B should read approximately 50% moisture content or slightly greater. If so the cycle of monitoring and pump control starts again. The moisture controller 1011 utilizes a separate flood control circuit with flood sensor which is independent of the microprocessor and performs its functions even if the microprocessor or its support components should fail. On the left side panel is the X10 multi-sensor, multi-pump connector, its embodiment is described below with reference to FIG. 9.

Flood sensor 114 should be placed where flooding may occur. In the event the flood sensor 114 becomes wet, it supplies 4.5 volts DC, via its plug-in type cord 114 to the moisture controller FLOOD SENSOR IN, labeled N in FIG. 3. When the flood circuit detects 4.5 volts DC present at its input, it will then activate FLOOD LED C and overrides the PUMP OUT P, holding them off until the flood condition is corrected. The flood circuit also overrides the buzzer ALARM D and provides a loud continuous 2.3 KHZ tone.

Figure 2:
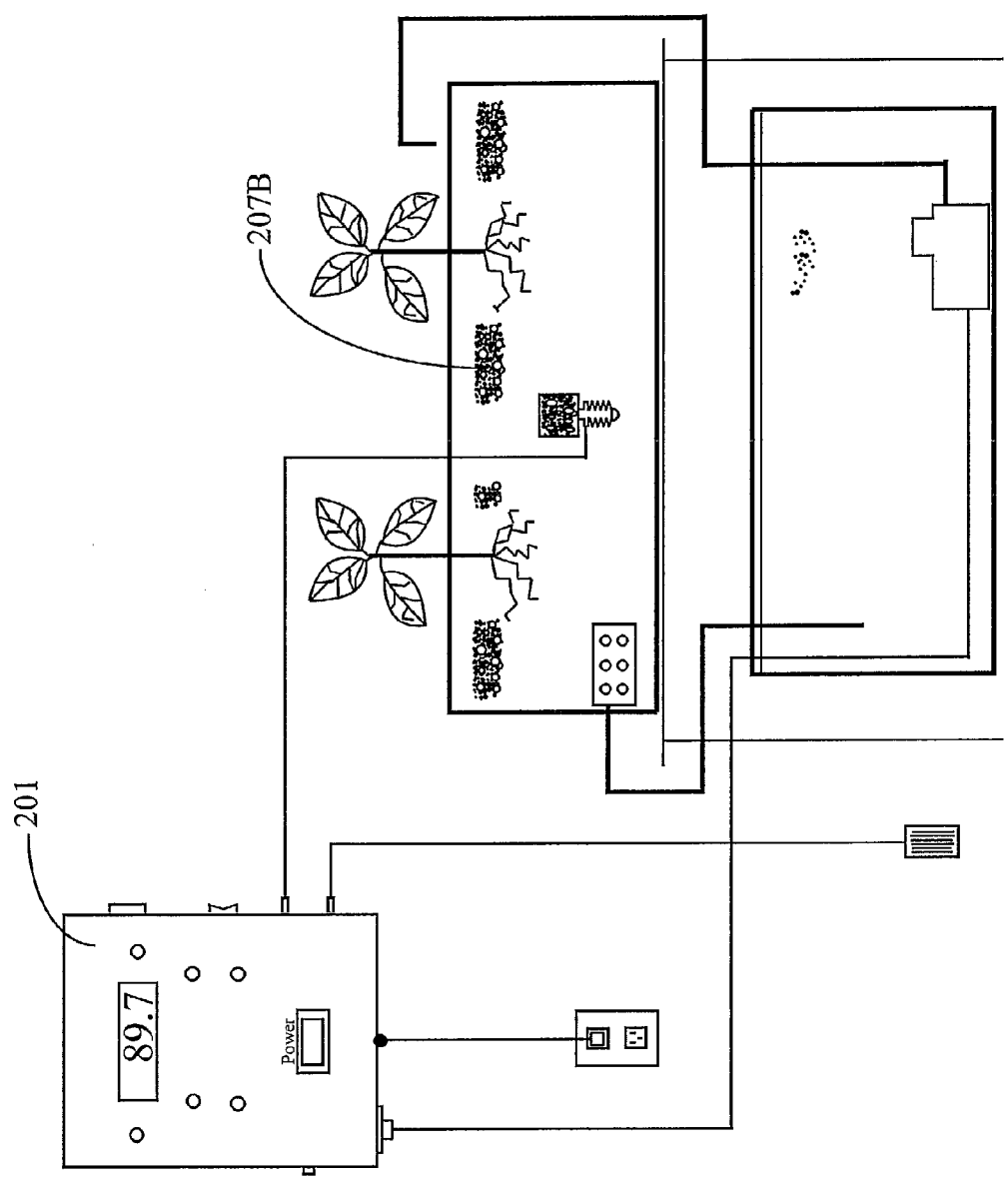
FIG. 2 is a two dimensional partial cutaway drawing, illustrating the digital moisture controller and sensor in a clay pellet or pumice stone type hydroponics medium.

FIG. 2 is analogous to FIG. 1 the only difference is FIG. 2 illustrates the moisture controller 201 with clay pellets or pumice stone medium 207B and shows the appropriate moisture sensor 103B for that particular application.

FIG. 3 is a larger scale unfolded two dimensional drawing of moisture controller 301 illustrating left, right, bottom and top panels laid flat in relation to the front panel. Moisture controller 301 panel components and their functions are listed here forward in alphabetical order. PUMP ON LED A indicates when the pump is running. Display B displays current moisture level form 0 to 100%, displays MIN indicating the moisture controller 301 is active, displays over and under +− indicating the MOISTURE SENSOR IN M, is too high or too low, displays programming minimum moisture level 0 to 100% and displays memory minimum moisture preset level. FLOOD on LED C indicates a flood condition exists. Buzzer ALARM D has two distinct tones: a multi-tone indicating watering cycle has initiated and a continuous 2.3 KHZ tone indicating a flood condition exists.

PRESET I is a momentary push-button-type switch. Push and hold preset I. This programs minimum moisture preset level at display B from 0 to 100%. ZERO ADJ F, is a 10-turn linear potentiometer which adjusts zero at display B. ACTIVE E is a momentary push-button-type switch. Push once to activate moisture controller 101 and MIN will appear in display.

After a 10-second period, push and hold Active E and the display will show the memory minimum moisture preset level. Push the active E once again and moisture controller 101 is deactivated and MIN. no longer appears in display B. In the deactivate mode the moisture controller 101 acts as a monitor and holds the pump control out and the pump on LED and watering cycle multi-tone in an off condition. Adjust 100% J, is a 10 turn linear potentiometer which adjust for 100% at the display B after applying water nutrient mix and placing moisture sensor at root level. ALARM ON G is a 2-position switch that switches the watering cycle multi-tone on or off. Fuse K houses a 5 amp fuse. POWER switch L is a 2-position switch that provides power to moisture controller 101 circuitry. MOISTURE SENSOR IN M is a connector that accepts the moisture sensors plug from 102. FLOOD SENSOR IN N is a connector that accepts flood sensor plug from 104. PUMP OUT P and PUMP OUT Q are common and supply 120 v AC to submersible pump or pumps. AC power cord O provides power to moisture controller 101. Din connector H, is a 3-pin din connector that provides common ground, and digital control signals to optional X10 multi-sensor, multi-pump controller. FUSE K, is the fuse housing and 5 amp fuse.

Figure 4:
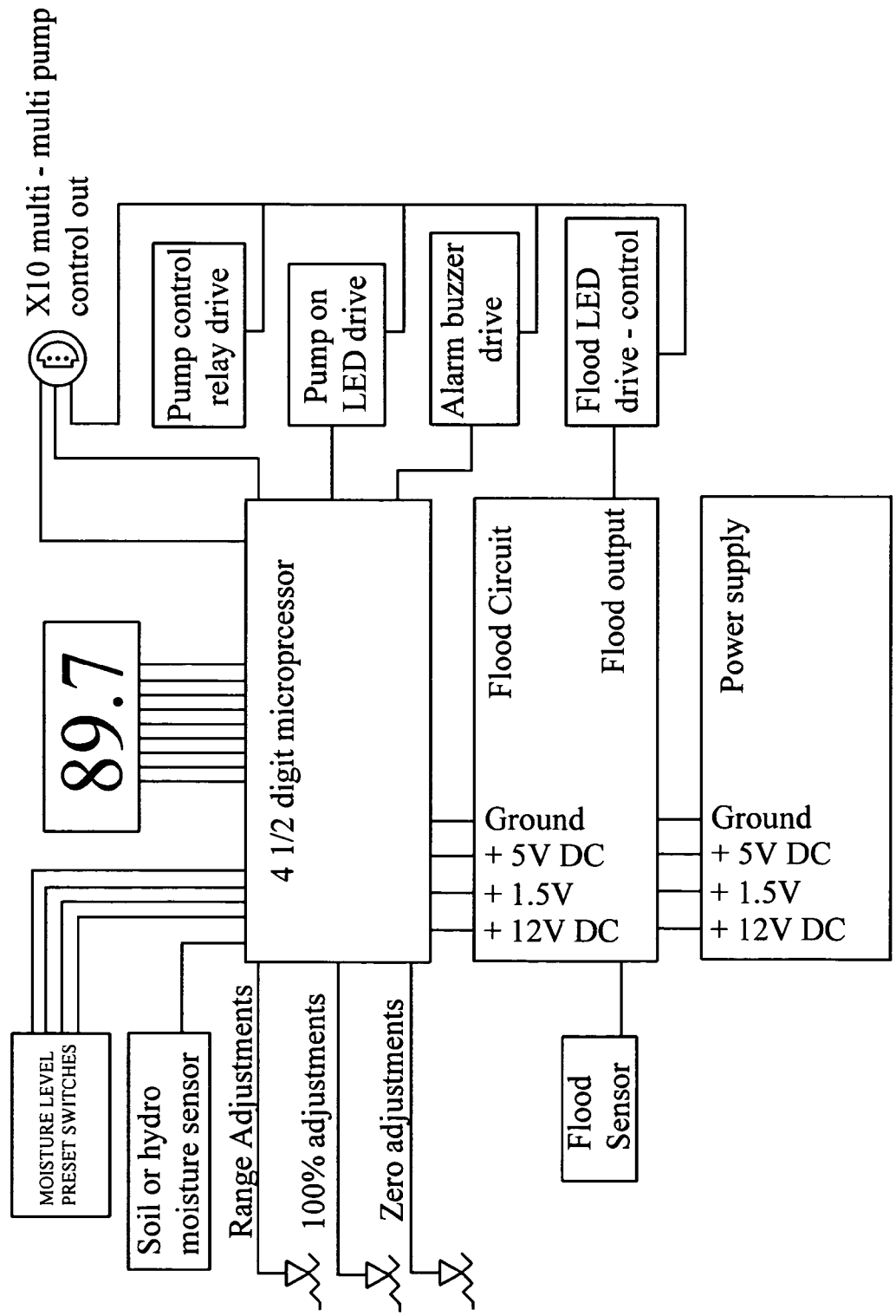
FIG. 4 is a electrical block diagram, illustrating the interconnections of the major functional components of the invention.

FIG. 4 is an electrical block diagram, illustrating the interconnections of the major circuit blocks.

Figure 5:
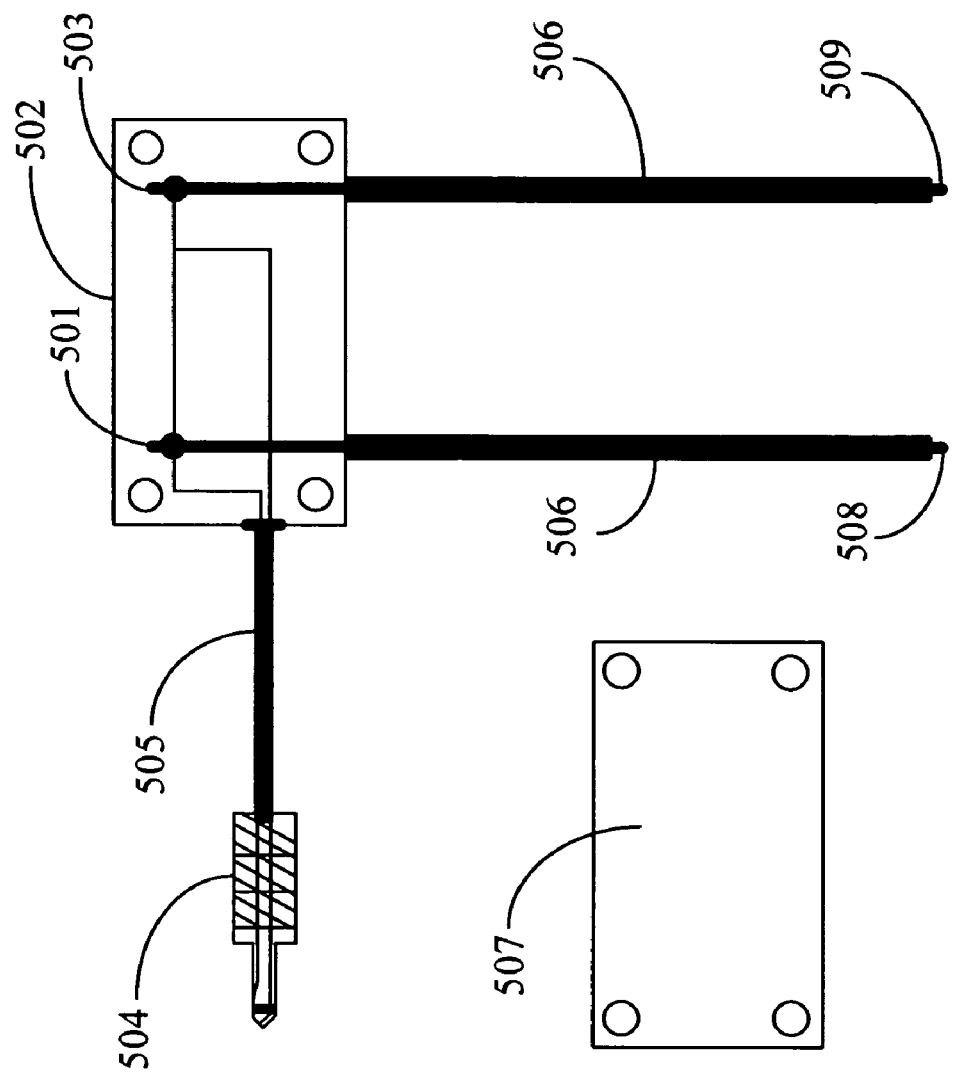
FIG. 5 is a two dimensional drawing, illustrating the soil or soil-less dual purpose type moisture sensor with the front cover removed.

FIG. 5 is a two-dimensional drawing, illustrating the soil or soil-less type moisture sensor with front cover removed. The electrical and hardware components are listed in numeral order. 501 is an aluminum rod probe and output wire fastener. 502 Is the flood sensor housing. 503 is an aluminum rod probe and input wire fastener. 504 is a two-conductor-type plug. 505 is a two wire conductor cord. 506 is an insulator sleeve resistant to corrosion and has a high electrical resistant. 507 is moisture sensor cover. 508 is the first aluminum rod probe tip AC conduction point. 509 is the second aluminum rod probe tip AC conduction point.

Figure 6:
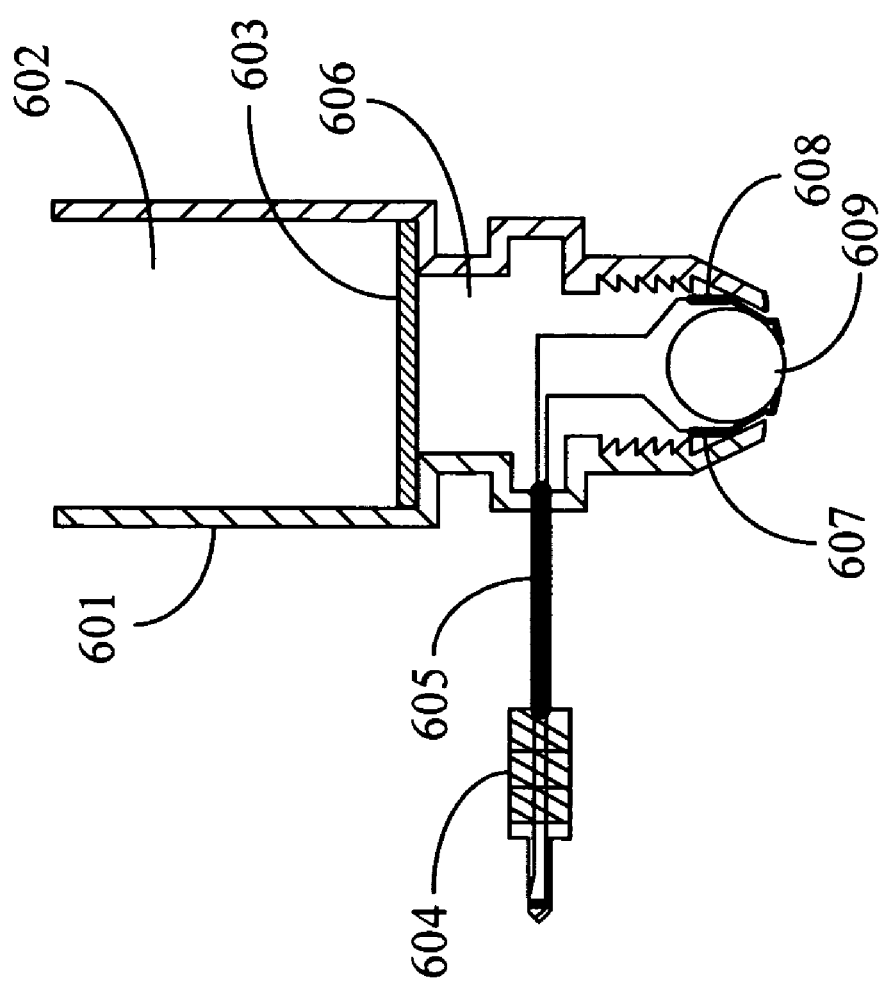
FIG. 6 is a cut away two dimensional drawing, illustrating the soil-less or hydroponics type sensor.

FIG. 6 is a cut-away two-dimensional drawing, illustrating the new hydroponics type sensor that is cylinder in shape with a wide opening at the top of the sensor, this provides enough inside area to obtain an average moisture content of the pellets or pumice stone within the medium chamber. The moisture sensor is designed to be buried at the root zone with the medium chamber filled with pellets or pumice stone and covered over. The electrical and hardware components are listed in numeral order. 601 is cylinder housing that protects and supports the internal sensor parts. 602 is the medium chamber. 603 is a fine mesh screen, which prevents any medium or roots from entering the moisture chamber. 604 is a two-conductor-type plug. 605 is a two-wire conductor cord. 606 is the moisture chamber. 607 is a non-corrosive insulator with embedded electrode. 608 is a non-corrosive insulator with embedded electrode. The embedded electrode tips act as the AC conduction point for both electrodes. 609 is actual pumice stone that has been tumbled in a metal polishing tumbler to obtain correct diameter and conformity.

Figure 7:
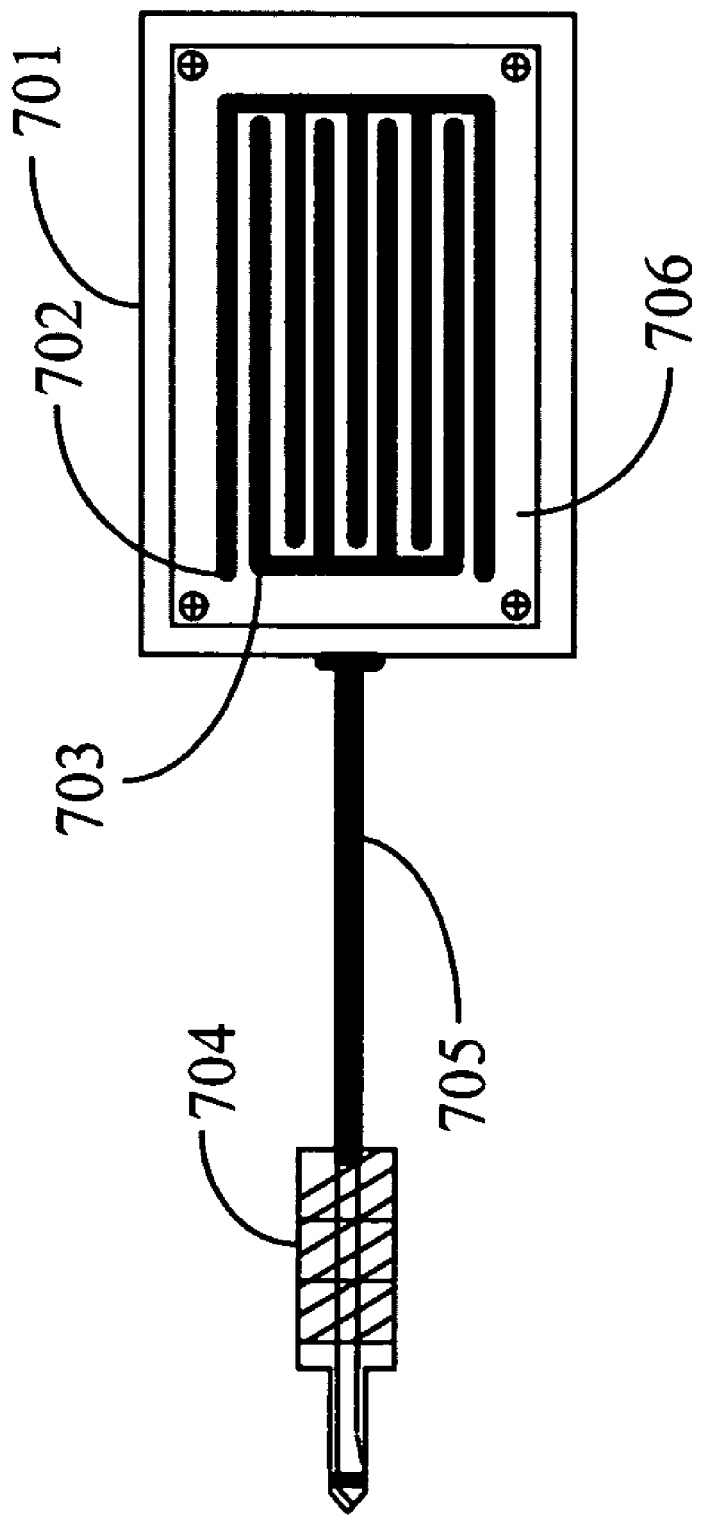
FIG. 7 is a two dimensional drawing, illustrating a bottom view of the flood sensor housing and the leaf type printed circuit board flood sensor screwed in place.

FIG. 7 is a two dimensional drawing illustrating a bottom view of the flood sensor housing and the leaf type printed circuit board pattern, which is screwed in place. The electrical and hardware components are listed in numeral order. 701 is the flood sensor housing. 702 is the flood sensor input.

Figure 8:
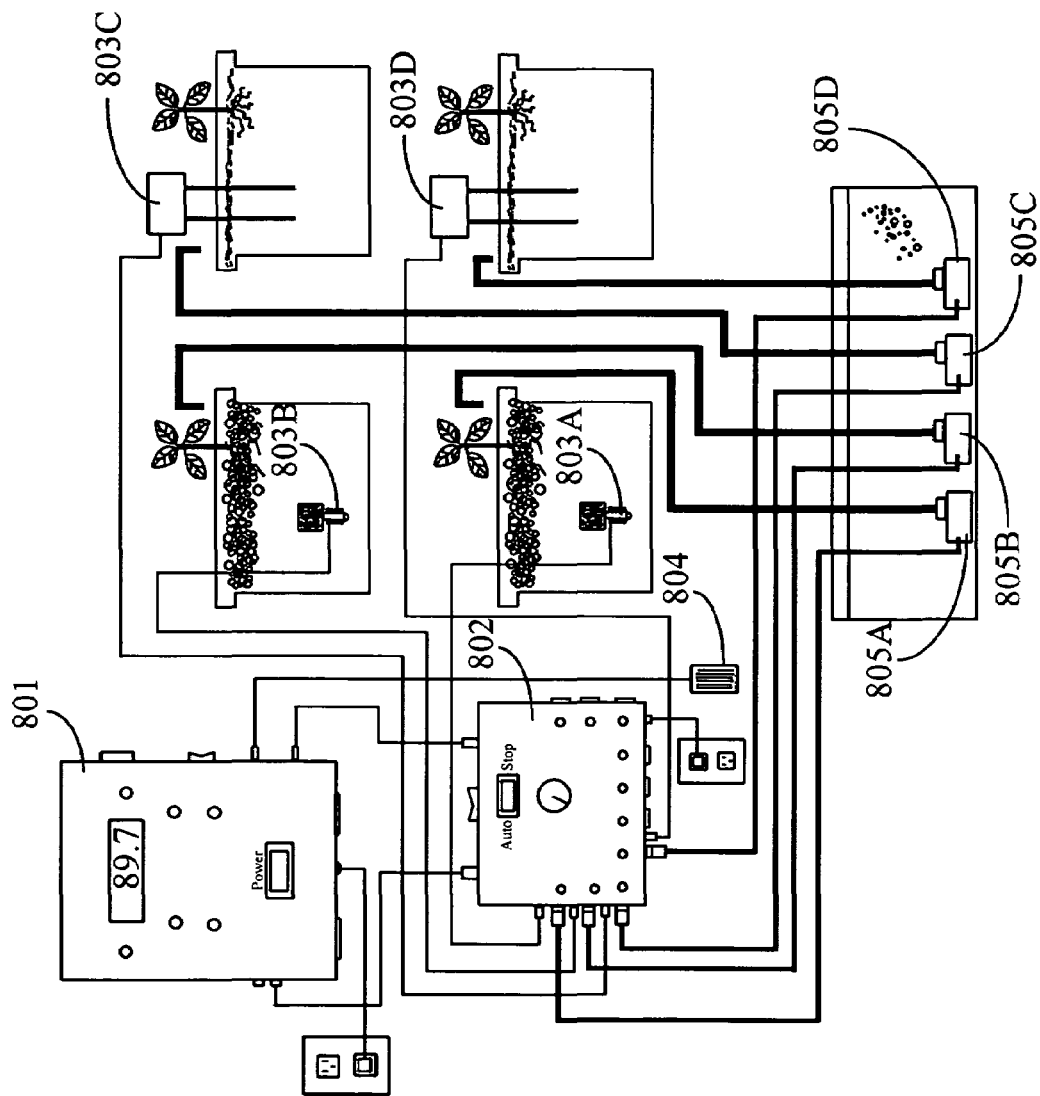
FIG. 8 is a two dimensional drawing illustrating the moisture controller and the multi-sensor, multi-pump controller device in use.

703 is the 4.5 volts DC moisture sensor output. 704 is a two-conductor plug. 705 is a two-conductor cord. 706 is the printed circuit board sensor, whose DC conduction point lies anywhere between the circuit board etches. FIG. 8 illustrates an optional device that works in conjunction with moisture controller 101. The device controls ten individual moisture sensors and ten individual pumps, which is referred to hereinafter as the X10 controller 802. In this application four sensors 803A, 803B, 803C, and 803D also four pumps 805A, 805B, 805C and 805D have been selected. Any further reference to the X10 controller 802 drawing should refer to FIG. 9 for larger scale. Set up for the X10 controller 902 (same as 802) is performed in the stop mode; any channel can be selected to stop at, when the AUTO STOP switch 9C (FIG. 9) is moved to the stop position the SENSOR OUT connector 9D will remain active, allowing for placement of moisture sensors and matching of their individual moisture levels. The X10 controller 902, utilizes two digital control signals and a common ground from moisture controller 801, via din connector 9A.

Figure 9:
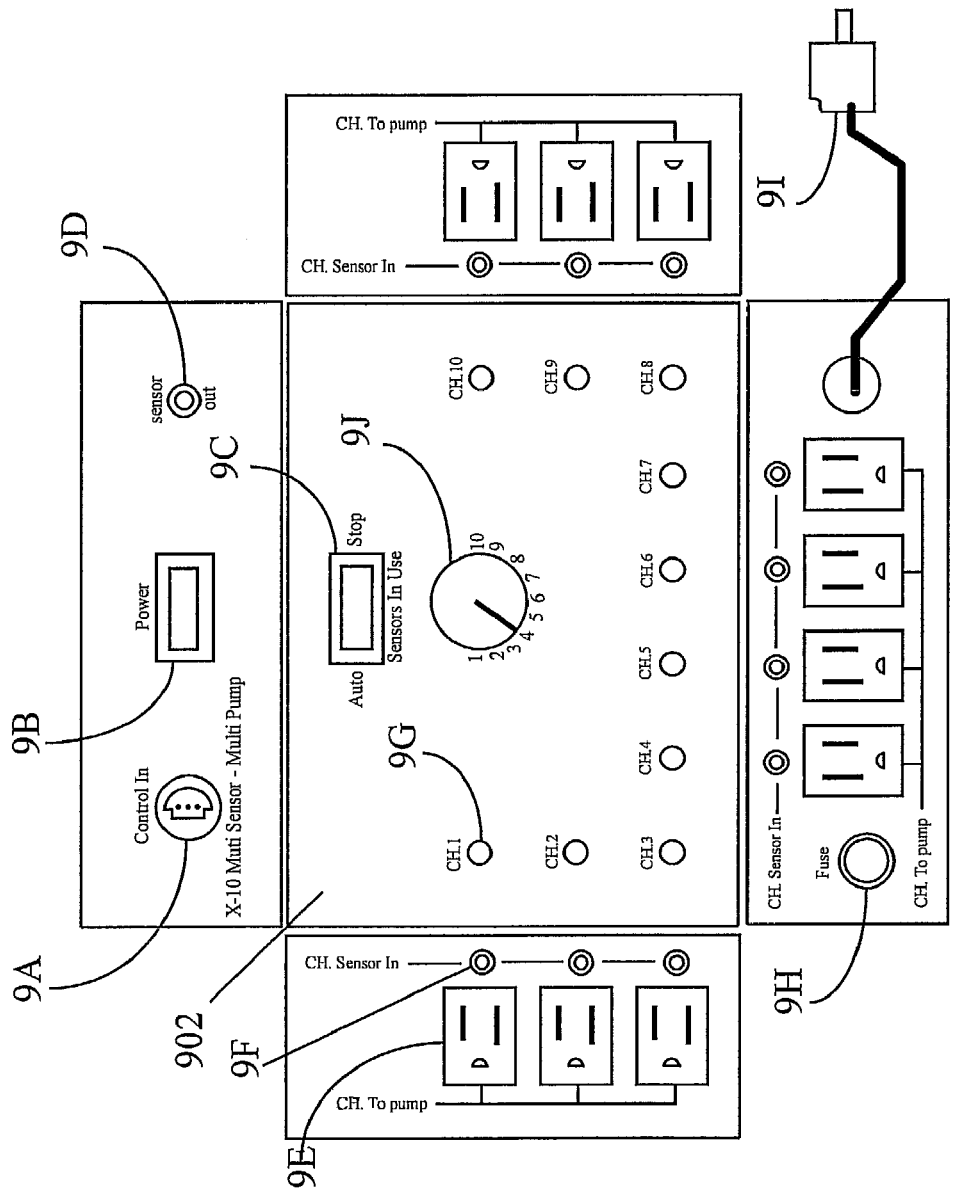
FIG. 9 is an unfolded two dimensional drawing, illustrating the X10 multi-sensor, multi-pump controllers left, right, top and bottom panels laid flat in relation to the front panel.

The first control signal is the minimum moisture preset out. The second control signal is flood condition out. FIG. 9 illustrates moisture sensors plug into CH SENSOR IN 9F connectors, SENSOR OUT connector 9D plugs into moisture controller 801 and pumps plug into CH. TO PUMP AC outlets 9E. With the POWER switch 9B in the on position and the AUTO STOP switch 9C in the auto position, the X10 controller 902 will automatically step through the channels up to the position selected on the, SENSORS IN USE selector switch 9J, at the selected position the next step will return to channel 1 and start the sequence again, only using the channels needed for the number of sensors in use. At each step point or channel the X10 controller 902 latches the individual sensor through its solid state relay to the SENSOR OUT connector 9D, and turns on CH1 indicator LED G. For example if the minimum moisture level should fall below the minimum preset level for channel one, the X10 controller 902 will stop at channel one, latch number one pump relay, activating CH. TO PUMP E AC outlet, and remain on until the minimum moisture preset level at moisture controller 801 is reached. In doing so the X10 controller 902 will step to channel two and start the process of comparing channel two's moisture sensor level to the n-minimum moisture preset level at moisture controller 801. Had a flood condition occurred during any mode of operation X10 controller 902 will stop at that channel and over ride the CH.TO PUMP AC outlets 9E, holding them off until the flood condition is corrected.

FIG. 9 is a larger scale unfolded two-dimensional drawing of the X10 controller 802, labeled in this drawing 902, illustrating left, right, bottom and top panels laid flat in relation to the front panel. The X10 controller 902 panel components and their functions are listed here forward in alphabetical order. A is a 3-pin din connector that inputs common ground and digital control signals. B is a single pole single throw POWER switch that provides power to the X10 controller 902 circuitry. C is a single pole single throw AUTO STOP switch used to stop the step sequence in order to place moisture sensors and match their moisture levels. D is a two-conductor SENSOR OUT connector. E is the CH. TO PUMP AC outlets. F is the CH. TO SENSOR connectors. G is the CH. 1 through 10 LED's. H is a fuse housing and five amp fuse. I is a power cord and plug. J is a ten position SENSORS IN USE selector switch, whose selected position determines the step sequence turn around point.

Figure 10:
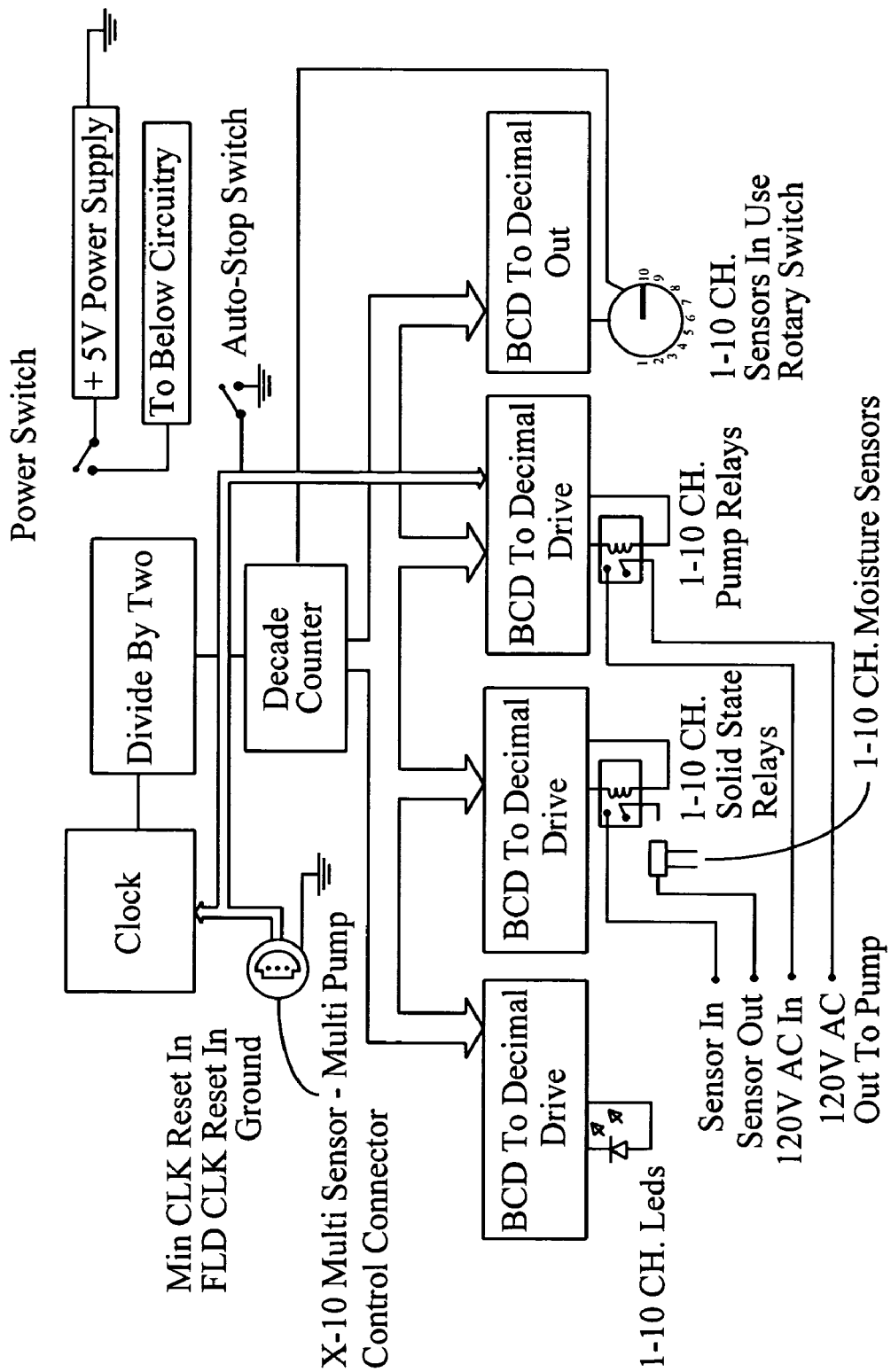
FIG. 10 is an electrical block diagram, illustrating the interconnections of the major functional components of the invention.

FIG. 10 is an electrical block diagram, illustrating the interconnections of the major circuit blocks.

In conclusion, herein is presented a fully automatic digitally-controlled moisture level monitor controller with the new hydroponics moisture sensors and the optional multi-sensor, multi-pump controller, providing operational simplicity and consistent accuracy, for controlling moisture levels in all soils and all of today's hydroponics grow mediums.

What is claimed is:

1. A digital moisture controlling system comprising:
   a medium chamber for containing at least a hydroponics porous medium;
   a moisture chamber containing a liquid;
   a pumping apparatus and conduit for conducting liquid from the moisture chamber to the medium chamber;
   a first moisture sensor placed within the medium; and
   a second moisture sensor positioned outside of and beneath the chambers for detecting a flood state;
   wherein the first moisture sensor measures the level of moisture in the porous medium by providing two electrodes with a porous element positioned between the electrodes transferring energy between the electrodes and through the porous element at a rate determined by the moisture content of the medium and the controller maintains the moisture content of the medium by comparing a sensor input from the first sensor with a preset moisture level and if the moisture level is below the preset amount the controller signals the pumping apparatus to pump liquid from the liquid chamber to the medium chamber until the preset moisture level is reached and the second moisture sensor overrides the first sensor when a flood condition is detected.

2. The controlling system of claim 1 wherein the moisture content is between 0 and 100 percent, 0 representing no moisture present and 100 representing complete moisture saturation of the medium and the preset moisture level is between 0-100 percent.

3. The controlling system of claim 1 including a third dual moisture sensor capable of detecting moisture in both a soil medium and a hydroponics medium including at least two insulated aluminum rods for means of transferring energy between probe tips of the rods at a rate determined by the moisture content of the medium and the controller also receives sensor input from the third sensor when maintaining the preset moisture level.

4. The digital moisture controlling system of claim 1 wherein said second sensor includes an array of printed circuit board etches adapted for placement with a flooring surface whereby energy is transferred between said etches as a result of wet flooring thereby detecting a flood state.

5. The digital moisture controlling system of claim 1 wherein sensor connection with the medium is accomplished by inserting the sensor to preferred root zone.

6. The digital moisture controlling system of claim 1 wherein the medium includes at least one of soil, rockwool or clay pellets.

* * * * *